July 7, 1970  M. S. BOLSTER  3,519,821
METHOD AND APPARATUS FOR CALIBRATING RADIATION
DETECTION AND MEASUREMENT INSTRUMENTS
Filed Aug. 15, 1966

INVENTOR.
MICHAEL S. BOLSTER

BY Christensen, Sanborn, & Matthews

ATTORNEYS

United States Patent Office 3,519,821
Patented July 7, 1970

3,519,821
METHOD AND APPARATUS FOR CALIBRATING RADIATION DETECTION AND MEASUREMENT INSTRUMENTS
Michael S. Bolster, Tumwater, Wash.
(12701 NE. 20th, Vancouver, Wash. 98665)
Filed Aug. 15, 1966, Ser. No. 572,298
Int. Cl. G01t 1/16
U.S. Cl. 250—83                     5 Claims

ABSTRACT OF THE DISCLOSURE

This application discloses an improved apparatus and method of calibrating instruments used for detecting and measuring radiation such as that emitted by radioactive materials. An X-ray unit is used in combination with radiation instrument holding means and a remote indicator to calibrate an unknown instrument after first correlating the X-ray control settings to the values read on a known instrument placed in the instrument holding means. Detailed instructions for carrying out the method are disclosed.

---

Figure 1:
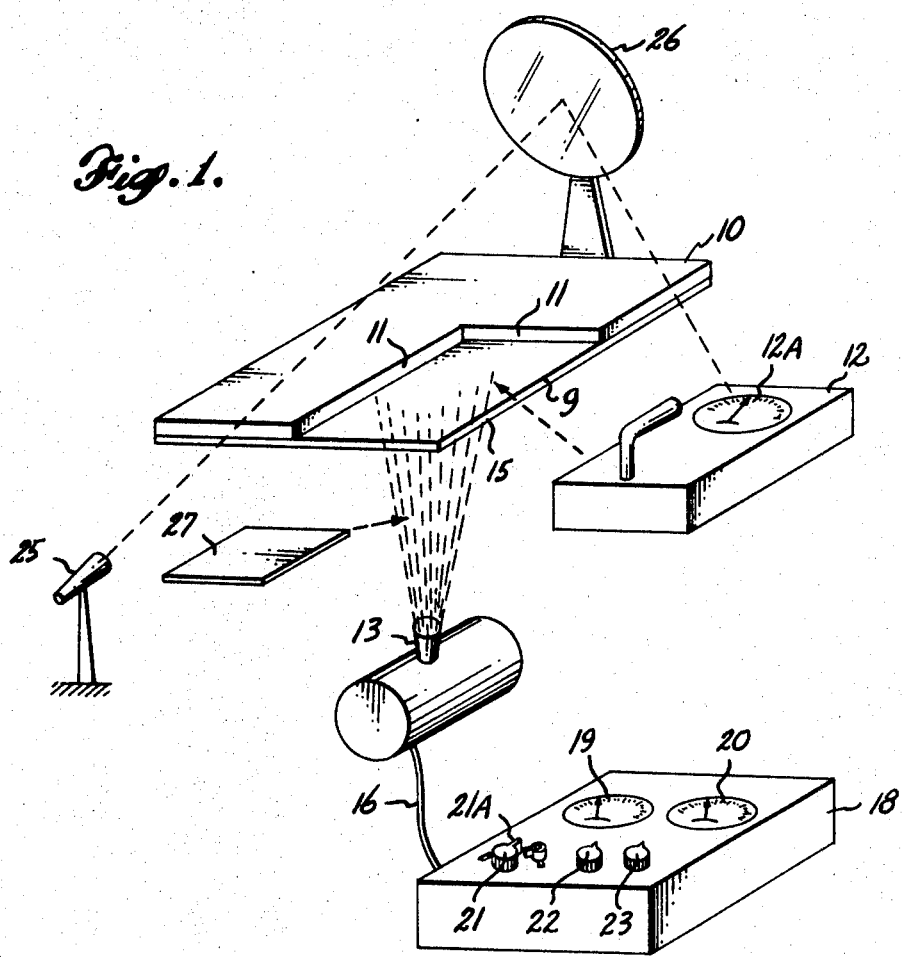

Various types of radiation detecting and measuring instruments such as Geiger counters find widespread usage at the present time. With the ever present possibility of active nuclear hostilities between nations of the world the availability of properly calibrated radiation instruments has become very important. Such instruments are now widely distributed among the population as part of civil defense networks established for assistance in the event of nuclear hostilities. It is elementary that if an instrument such as a radiation detecting or measuring instrument is to be of any practical value in the field it must be properly calibrated. To assure continued accuracy and usefulness of such instruments it is necessary to periodically recalibrate the same. This has presented a substantial problem in that the generally accepted technique for calibrating instruments of this type is to place the same in the path of the radiation emitted from a radioactive source such as the well known cesium 137 or cobalt 60 standards, or others. Once the instruments have been calibrated and distributed to areas remote from a central facility having the appropriate safety equipment to safeguard the use of such radioactive sources, a major problem is encountered in recalibrating such instruments. Up to the present time one of two procedures has been followed: either the instrument is shipped to a central facility having the necessary safety standards and approved by the Atomic Energy Commission, or a portable source of radioactive material is transported throughout the geographic area in which instruments are located. The first procedure often results in jolting of the instruments which is sufficient to alter the calibration adjustment. As a result the use of a central calibration facility has not been favorably accepted as a calibration procedure. The second requires extensive safety equipment and compliance with rigid standards established to prevent accidental exposure of people to the radiation from the portable source.

It is therefore an object of the present invention to provide an improved method of calibrating radiation detecting and measuring instruments. Another object of the present invention is to provide an improved apparatus for use in the novel method of calibrating such instruments without the need for a portable radioactive source being transported to the various geographic areas wherein instruments to be calibrated are located. A further object of the present invention is to provide a novel and simplified method of calibrating radioactivity detecting and measuring instruments using an X-ray source.

In accordance with the teachings of the present invention a first meter, referred to as a first meter "A," is accurately calibrated using a radioactive source such as a cesium 137 standard. Once this meter A has been accurately calibrated using such radioactive source in an approved facility having the appropriate safety equipment for handling such source material, the instrument is then used as a standard. This standard instrument is then transported to any given location wherein other similar instruments are to be calibrated. At such location an X-ray unit is in effect calibrated using the standard instruments. That is, the standard instrument is positioned in a suitable holder in the path of the X-rays from the source and the controls for the X-ray source are adjusted to bring the standard instrument to a given reading on any selected scale of the instrument. The readings of the standard instrument are noted and the X-ray unit intensity controls are locked in position for that reading. The voltage is then turned off to stop the emission of ionizing radiation.

Following the above procedure the known instrument is replaced by the unknown instrument with the unknown instrument being held in the exact physical location of the known instrument. This insures accurate calibration since each meter is then subjected to the same conditions of background radiation, shielding, etc. The intensity controls for the X-ray source having been locked in position, the voltage is then returned to the same value as before. An adjustable stop is preferably provided so that the voltage control member is easily and accurately returned to its previous setting. If the instrument being calibrated does not read the same as the "A" instrument, it is adjusted to that of the standard instrument when the X-ray source was being in effect "calibrated" by the standard instrument. The second instrument then is in a calibrated condition for that scale. The procedure is then repeated for each of the other scales.

To assure absolute accuracy it is considered advantageous to periodically place the standardized A instrument back on the table in the path of the X-rays to check the consistency of the X-ray intensity for the preset conditions. In practice it is also advantageous to utilize variable filters to reduce X-ray intensities when calibrating at levels lower than the minimum intensity of the X-ray unit.

Figure 2:
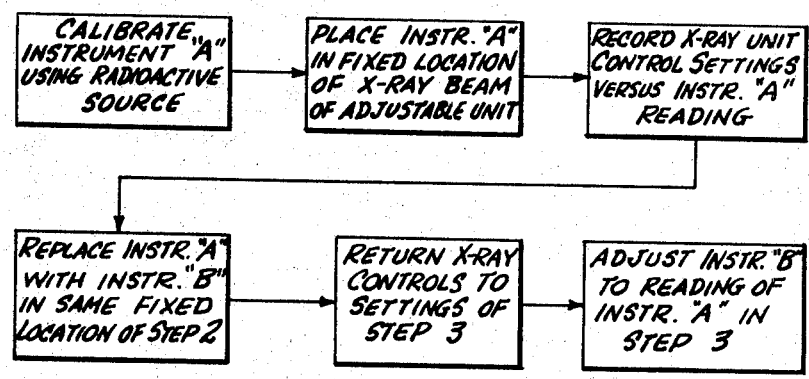

The above as well as additional advantages and objects of the invention will be more clearly understood from the following description when read with reference to the accompanying drawing and wherein, FIG. 1 is a diagrammatic illustration of a preferred type of equipment to be used in the field for calibrating radiation detecting and measuring instruments in accordance with the method of the present invention, and FIG. 2 is a block diagram flow-chart setting forth the steps to be followed in accordance with one method of the present invention for calibrating a radiation instrument.

Referring now to the drawings it will be seen that a rigid instrument holding member illustrated as a table-top 10 is provided with instrument aligning cutout portion having edges 11 in one corner thereof for holding a radiation detecting instrument 12 in position thereon. An X-ray source 13 is shown as providing a beam of X-rays 14 through any suitable filter 15 (such as a sheet of copper) onto the instrument 12. The power supply cable 16 leads from the X-ray unit 13 to the control panel 18 shown as having a voltage indicating meter 19 and a current meter 20. An adjustable voltage control knob 21 and coarse and fine intensity control knobs 22 and 23 are shown on the instrument panel. As is well known in the art, the X-ray source can be operated at any selected constant voltage level by means of a suitable voltage regulator circuit with the intensity of the radiation being further determined by the intensity controls 22 and 23 which control the current for the X-ray tube. The controls 22 and 23 can be locked in any given position, and the control 21 is provided with an adjustable stop means 21A to permit rapid and accurate turn-off and turn-on of the voltage to a predetermined value. The readings of indicators 19 and 20 can also be recorded for given readings of an instrument 12 so that the same operating conditions can later be acquired by the operator, but in practice it has been found that locking the controls 22 and 23 and turning the voltage on and off is more expeditious.

A suitable optical instrument such as the telescope 25 is focused on a mirror 26 secured to table 10 in a position to permit remote reading of the instrument indicator 12A. Additional filters 27 can be selectively positioned in the path of the X-ray beam 14 for calibration at levels lower than the minimum intensity of the X-ray unit.

It should be noted that the X-ray source is positioned below the table 10. This eliminates scatter from the floor, and also by virtue of the table 10 being placed on top of and immediately adjacent the source the amount of radiation received by the operator is reduced. The instrument aligning surfaces 11A provide a simple means for assuring accurate alignment of each instrument in the same exact physical location and also permits the ready calibration of instruments of different physical size from the standard.

The method of calibrating the radiation instruments is to first standardize a given instrument by subjecting the same to a radioactive source such as cesium 137 standard. This standardized instrument is then used to in effect "calibrate" an X-ray source so that the control settings for the X-ray source can be locked in position or otherwise recorded for any given reading of the standardized instrument. Thereafter the instruments to be calibrated are successively positioned in the exact location of the standarized instrument and the controls for the X-ray unit returned to their preestablished settings with the various radiation instruments then being adjusted to read exactly the same as the standardized instrument read for such setting of the X-ray controls.

The steps to be performed are set forth in greater detail in the block diagram flow-chart of FIG. 2. Thus referring to FIG. 2 it will be seen that the first step in the method is to calibrate the instrument referred to as the "A" or standardized instrument using a radioactive source. The second step is to subject the "A" instrument to the X-rays of the given X-ray source. The third step is to adjust the intensity of the X-rays to various levels and record the X-ray control settings versus instrument "A" readings. This step is preferably accomplished by locking the intensity controls and setting an adjustable limit for the voltage control. The fourth step is to replace the "A" instrument with the instrument to be calibrated making certain that the "B" (or unknown) instrument is in the exact physical location of the standardized instrument. The apparatus of FIG. 1 facilitates such placement. The fifth step is to return the X-ray controls to the preestablished settings of step number three, and adjust the instrument being standarized in accordance with step five so that it reads the same as the reading previously recorded in step number three for the standardized meter. In practice the last step advantageously includes viewing the meter indicator and noting the adjustment needed so that the same can be accomplished after the voltage has been turned off.

The teachings of the invention can also be practiced by placing a radiation detector adjacent the meter holding fixture with a remote indicator for such detector being placed adjacent to the X-ray controls. Then when the known instrument is in position the reading of the remote indicator is logged for a given instrument reading. Then when the unknown instrument is in position the X-ray controls are adjusted to bring the remote indicator readings to the logged value and the reading of the unknown noted and brought into correspondence with the reading of the known meter.

An important advantage of the present method is that a relatively low energy X-ray unit can be utilized to calibrate instruments which are used for detecting and measuring very high energy gamma rays. For example a 175 kilovolt X-ray unit has been utilized for calibration of instruments operating in the million electron volt range. This is made possible since the present method operates on a comparison basis rather than on the basis of each instrument being subjected to an absolute standard radiation source. It is found in practice that so long as the same type of instruments are being used as the standardized instrument as those which are being calibrated that a low intensity X-ray source provides accurate calibration energy. Thus the dangers of high energy radiation sources are effectively eliminated and the requirements of extreme safety associated with transportation of radioactive sources about the country are eliminated.

There has thus been disclosed a novel apparatus for use in an improved method of calibrating radiation detecting and measuring instruments, which method makes use of a radioactive source only for obtaining a standardized meter and then thereafter using such standardized meter in combination with the low energy X-ray source of the apparatus to calibrate additional meters.

What is claimed is:

1. A method of calibrating radiation detecting and measuring instruments comprising the steps of calibrating a first instrument by subjecting it to the radiation from a known radioactive source; placing said first instrument in the beam path of an adjustable X-ray unit; turning the X-ray unit on and adjusting the controls of said X-ray unit to a first condition to establish a correlation between the control setting and a first reading on said known instrument; turning said X-ray unit off and replacing said known instrument by an unknown instrument with the unknown instrument being located in the same geometrical position with respect to the X-ray beam as was the known instrument; returning the controls of said X-ray unit to said first condition; and adjusting said unknown instrument so that its reading for the controls being in said first condition corresponds to said first reading of said known instrument.

2. The method of claim 1 wherein the intensity control for the X-ray unit is maintained at the position corresponding to said first condition and the voltage control for the X-ray unit is moved between an off position and a position corresponding to said first condition.

3. A radiation instrument calibrating apparatus comprising in combination: an X-ray unit having an X-ray emitting portion and having intensity and voltage control means; adjustable control limit means selectively settable for limiting the voltage to which said voltage control means can be set; radiation instrument holding means disposed above the X-ray emitting portion of said unit and having means for holding an instrument inserted therein in a predetermined position in the path of the beam of the X-ray unit; and remote indicator means for providing a remote reading of an instrument placed in said instrument holding means.

4. Apparatus as defined in claim 3 wherein said instrument holding means includes a planar member having one corner removed therefrom to provide a right angled abutment surface for receipt of radiation detecting instruments.

5. Apparatus as defined in claim 3 wherein said remote indicator means includes a mirror secured to said holding means and directed toward the position occuplied by an instrument held by said holding means.

References Cited

UNITED STATES PATENTS 2,816,235   12/1957   Scherbatskoy.
2,837,659   6/1958   Hendee et al.

ARCHIE R. BORCHELT, Primary Examiner

U.S. Cl. X.R.

250—83.3, 83.6